United States Patent
Ido

(10) Patent No.: US 8,433,014 B2
(45) Date of Patent: Apr. 30, 2013

(54) RECEIVING APPARATUS AND RECEIVING METHOD

(75) Inventor: Jun Ido, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 926 days.

(21) Appl. No.: 12/527,555

(22) PCT Filed: Dec. 26, 2007

(86) PCT No.: PCT/JP2007/074997
§ 371 (c)(1),
(2), (4) Date: Aug. 17, 2009

(87) PCT Pub. No.: WO2008/099572
PCT Pub. Date: Aug. 21, 2008

(65) Prior Publication Data
US 2010/0086083 A1    Apr. 8, 2010

(30) Foreign Application Priority Data
Feb. 15, 2007  (JP) ................ 2007-034689

(51) Int. Cl.
H03D 1/04 (2006.01)

(52) U.S. Cl.
USPC ........................................ 375/346

(58) Field of Classification Search ........... 375/316, 375/340, 346, 350, 259, 285; 370/203, 210; 708/100, 200, 300, 400, 403, 405
See application file for complete search history.

(56) References Cited

U.S. PATENT DOCUMENTS

| 6,088,327 A | 7/2000 | Muschallik et al. | |
| 7,773,683 B2 * | 8/2010 | Tseng et al. | 375/260 |
| 2004/0022175 A1 * | 2/2004 | Bolinth et al. | 370/203 |
| 2006/0172713 A1 | 8/2006 | Suzuki et al. | |
| 2006/0239367 A1 * | 10/2006 | Wilhelmsson et al. | 375/260 |
| 2008/0304585 A1 * | 12/2008 | Song | 375/260 |

FOREIGN PATENT DOCUMENTS

| JP | 2000-236313 A | 8/2000 |
| JP | 2003-218826 A | 7/2003 |
| JP | 11-506590 A | 6/2009 |
| WO | WO-2005/002101 A1 | 1/2005 |

OTHER PUBLICATIONS

Itami Makoto et al., "Comprehensible OFDM Technique", Ohmsha (2005), pp. 39-44.

* cited by examiner

*Primary Examiner* — Shuwang Liu
*Assistant Examiner* — Vineeta Panwalkar
(74) *Attorney, Agent, or Firm* — Birch, Stewart, Kolasch & Birch, LLP

(57) ABSTRACT

The steps and corresponding structures include: extracting at least K+N pieces of data corresponding to one symbol including a guard interval from a frequency-transformed received signal to generate 2N pieces of data, as expanded time axis data, by adding zero before and after the extracted data; shaping, by utilizing a window shaping part, a waveform by multiplying the expanded time axis data by a window coefficient; performing DFT (discrete Fourier transform), by utilizing a DFT part, with respect to output of the window shaping part; performing a demodulation of a sub-carrier by extracting a sub-carrier component; calculating an inter-carrier interference component from output of the DFT part; and selecting a window coefficient based on the inter-carrier interference component to output to the window shaping part.

25 Claims, 10 Drawing Sheets

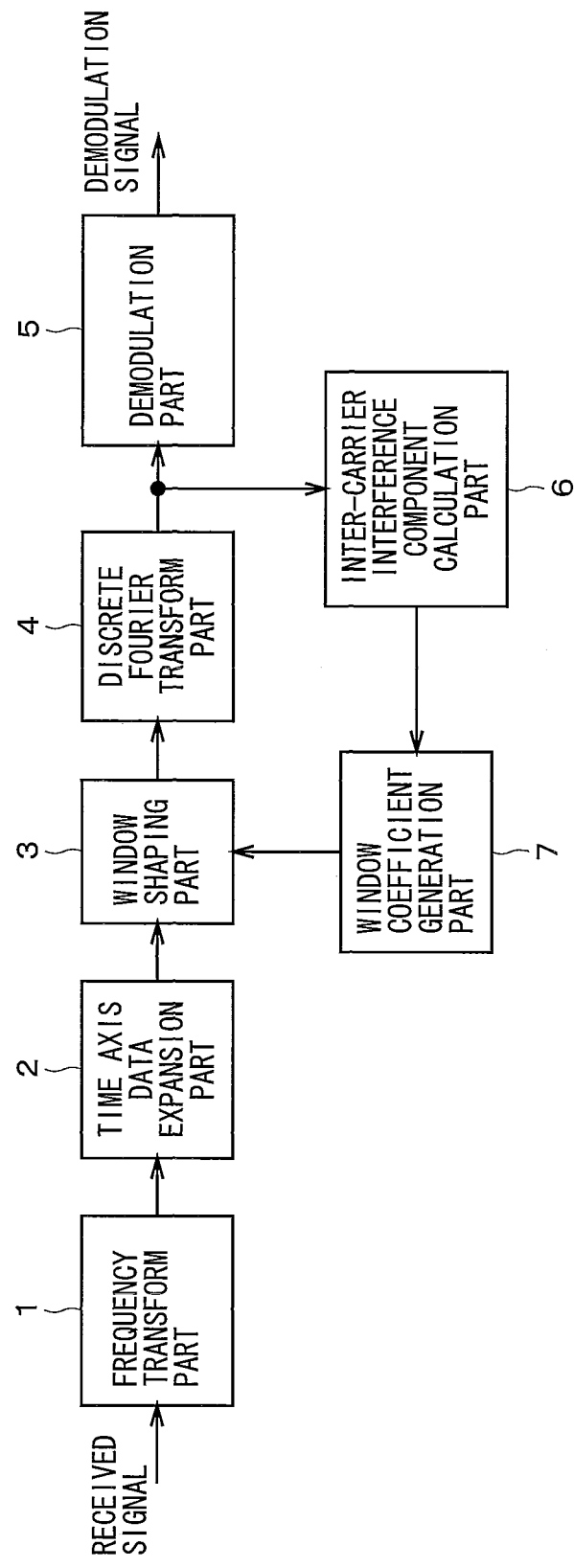

F I G. 8
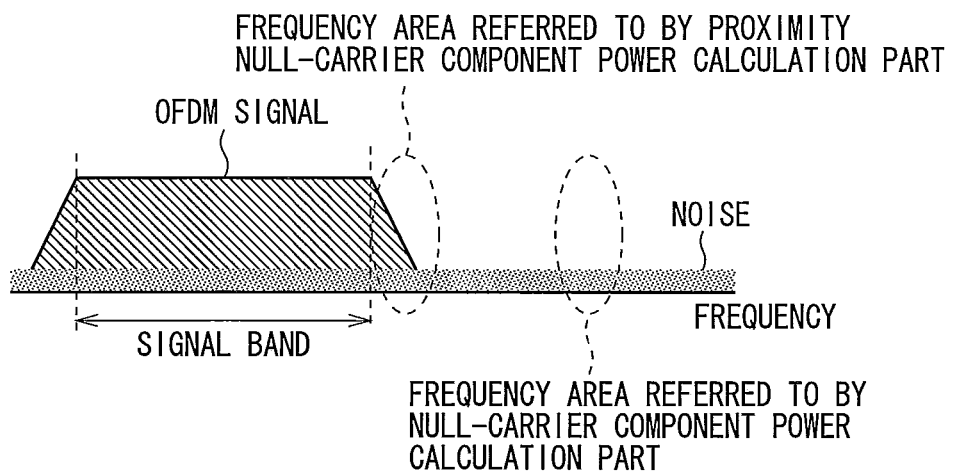

F I G. 1 1
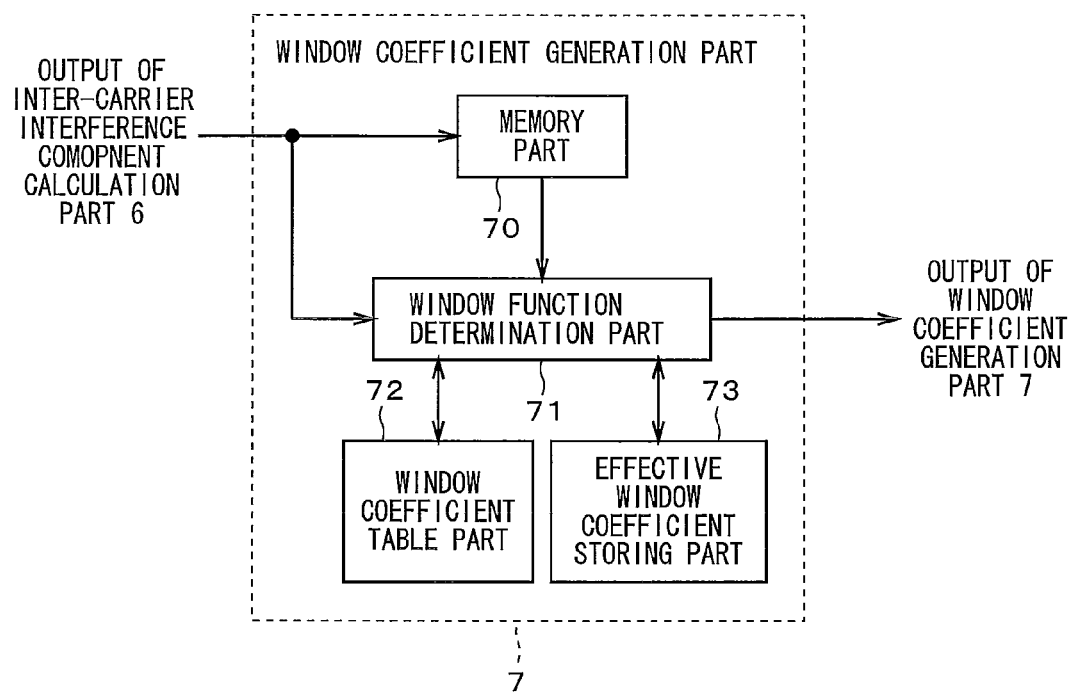

RECEIVING APPARATUS AND RECEIVING METHOD

TECHNICAL FIELD

This invention relates to a receiving apparatus (also referred to as a receiver) for receiving an orthogonal frequency division multiplexing signal (hereinafter, also referred to as an "OFDM signal"), and a receiving method.

BACKGROUND ART

A conventional orthogonal frequency division multiplexing signal receiving apparatus is constituted to generate a received signal per sub-carrier by performing a discrete Fourier transform capable of transforming discrete data, the number of which is greater than or equal to that of a sub-carrier, after transforming a frequency of a received signal into a predetermined frequency band and performing a serial-parallel transform (see Non-Patent Document 1). When QPSk (Quadrature Phase Shift Keying) or QAM (Quadrature Amplitude Modulation) is employed as a sub-carrier modulation scheme, demodulation of each sub-carrier is implemented by correcting amplitude and a phase of a sub-carrier (hereinafter, also referred to as "equalization") based on a result of estimating an amplitude variation amount and a phase variation amount of each sub-carrier in a channel (hereinafter, also referred to as a "channel estimation") using, for example, a known signal (hereinafter, also referred to as a "pilot signal") previously inserted in a transmitted signal.

Patent Document 1: Japanese Patent Application Laid-Open No. 2000-236313 (FIG. 9)

Non-Patent Document 1: Itami Makoto, "Comprehensible OFDM Technique," Ohmsha, pp. 39-44.

The conventional receiving apparatus performs the discrete Fourier transform represented by a FFT (Fast Fourier Transform) in accordance with a symbol synchronization timing between transmission and reception with respect to a received signal which frequency is transformed to a predetermined frequency, to calculate a received signal per sub-carrier. Accordingly, in the cases when a sub-carrier frequency is not synchronized between transmission and reception, when inter-symbol interference among symbols is caused by symbol timing synchronization errors, and when a Doppler shift of a sub-carrier frequency is caused by a time variation of a channel characteristic, the problem arises that inter-carrier interference gets larger, increasing the probability of erroneously regenerating a transmitted signal.

DISCLOSURE OF INVENTION

The present invention has been made to solve the problems above, and an object of the present invention is to reduce deterioration due to the inter-carrier interference after a discrete Fourier transform and accurately reproduce a transmitted data in the receiving apparatus.

A subject matter of the present invention is a receiving apparatus for receiving an orthogonal frequency division multiplexing signal generated by adding K pieces (K<N) of data which is at the end of a signal of inverse discrete Fourier transform output as a guard interval to the head of a signal after mapping transmitted data of each sub-carrier at a signal point position in accordance with a predetermined modulation scheme and performing an inverse discrete Fourier transform of N points (N>M) in order to transmit transmitted data with M pieces of sub-carriers, the receiving apparatus includes; a frequency transform part for transforming a frequency of the received signal to a desired frequency, a time axis data expansion part for extracting at least K+N pieces of data corresponding to one symbol including a guard interval from output of the frequency transform part to generate 2N pieces of data by adding zero before and after the extracted data, a window shaping part for shaping a waveform by multiplying output of the time axis data expansion part by a window coefficient, a discrete Fourier transform part for performing a discrete Fourier transform of 2N points with respect to output of the window shaping part, a demodulation part for performing a demodulation of sub-carriers by extracting transmitted sub-carrier components from output of the discrete Fourier transform part, an inter-carrier interference component calculation part for calculating an inter-carrier interference component, with the output of the discrete Fourier transform part as input, and a window coefficient generation part for selecting a window function on the basis of output of the inter-carrier interference component calculation part to output the window coefficient in accordance with the selected window function to the window shaping part.

According to the subject matter of the present invention, an optimum window function is generated on the basis of a size of the inter-carrier interference component calculated on real time by using an out-of-signal-band component after the discrete Fourier transform to perform a waveform shaping with respect to a received signal before the discrete Fourier transform by using the determined window function, and then a sub-carrier component is generated by performing the discrete Fourier transform with respect to the waveform shaped signal, allowing a demodulation operation so as to minimize the inter-carrier interference due to synchronous misalignment of a sub-carrier frequency between transmission and reception, synchronous misalignment of a symbol timing such that inter-symbol interference is generated, or inter-carrier interference caused by a time variation of a channel characteristic and so on, to improve a receiving performance of the receiving apparatus.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a block diagram for showing a configuration of a receiving apparatus according to the first preferred embodiment of the present invention.

FIG. 8 is a view for showing power components calculated by the inter-carrier interference component calculation part.

FIG. 11 is a block diagram for showing a window coefficient generation part according to the second preferred embodiment of the present invention.

BEST MODE FOR CARRYING OUT THE INVENTION

Figure 2:
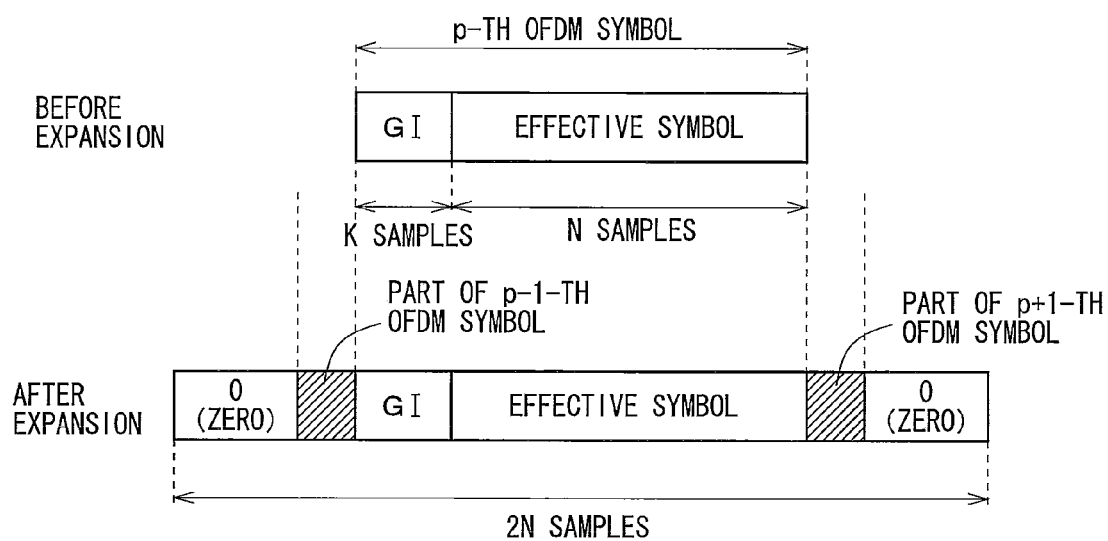
FIG. 2 is a view for showing a relation between input and output of a time axis data expansion part.

First, prior to a description of the preferred embodiments of the receiving apparatus according to the present invention, a transmission technology with an orthogonal frequency division multiplexing scheme and a receiving technology used in the present invention which are necessary for understanding the present invention will be briefly described.

A digital transmission technology with the orthogonal frequency division multiplexing scheme is a transmission scheme for transmitting and receiving demodulated and multiplexed information by a plurality of sub-carriers with frequencies being orthogonal to each other, which is put into practical use especially in the fields of broadcasting and communication.

In the above transmission with the orthogonal frequency division multiplexing scheme, transmitted informations (hereinafter also referred to as "transmitted data") are distributed to a plurality of sub-carriers, and subjected to a digital modulation in each sub-carrier with QPSK (Quadrature Phase Shift Keying), QAM (Quadrature Amplitude Modulation), multi-valued PSK or the like. A known signal is multiplexed as a specific sub-carrier as a signal used for demodulating a sub-carrier at a receiver. These multiplexed sub-carriers are orthogonal transformed by an inverse discrete Fourier transform process, and transmitted with a frequency being transformed to a desired transmitted frequency.

Specifically, transmitted data to be transmitted at a transmission is mapped in accordance with a modulation scheme of each sub-carrier, being subjected to an inverse discrete Fourier transform. Next, the last part of the inverse discrete Fourier transformed signal is copied to the head of the signal. This part is called a "guide interval," and the signal is to be reproduced without causing an inter-symbol interference at the receiver even with a delay waveform having a delay time with a length of the guide interval or less by adding the guide interval. That is, the "orthogonal frequency division multiplexing signal" is a signal generated by adding K pieces (K<N) of data which is at the end of a signal of inverse discrete Fourier transform output as the guard interval to the head of a signal after mapping transmitted data of each sub-carrier at a signal point position in accordance with a predetermined modulation scheme and performing an inverse discrete Fourier transform of N points (N>M) in order to multiplex transmitted data with M pieces of sub-carriers.

Every sub-carrier is orthogonal to each other in the orthogonal frequency division multiplexing scheme, so that transmitted data can be accurately reproduced at the receiver when frequency synchronization of each sub-carrier is established between a transmitter and the receiver. Accordingly, the receiving apparatus for receiving the orthogonal frequency division multiplexing signal transforms a frequency to a desired frequency band by orthogonally demodulating a complex digital signal with the orthogonal frequency division multiplexing scheme to be inputted so as to establish timing synchronization and sub-carrier frequency synchronization between the transmitter and receiver, generating a received signal per sub-carrier by performing a discrete Fourier transform with respect to the frequency-transformed received signal in the above to perform a demodulation.

Then, a phase change and amplitude change caused by a channel and a timing error of the discrete Fourier transform are corrected to demodulate the received signal per sub-carrier generated by the discrete Fourier transform. Here, with respect to the correction of the phase and amplitude, the correction is carried out by using pilot signals inserted at the transmitter. For instance, in a ground digital TV broadcast scheme in Japan, a scattered pilot is periodically inserted, and an orthogonal frequency division multiplexing receiver performs a demodulation of each sub-carrier by estimating a channel characteristic on the basis of the scattered pilots. As this demodulation operation is a well-known technology (see Patent Document 1), the description on details thereof will be omitted here.

(First Preferred Embodiment)

FIG. 1 is a block diagram for showing a configuration of a receiving apparatus according to the present embodiment. As shown in FIG. 1, the receiving apparatus is consisted of a frequency transform part 1, a time axis data expansion part 2, a window shaping part 3, a discrete Fourier transform part 4, a demodulation part 5, an inter-carrier interference component calculation part 6 and a window coefficient generation part 7.

Next, an operation of the present receiving apparatus will be described. First, the received orthogonal frequency division multiplexing signal is inputted to the frequency transform part 1, and transformed to a desired frequency. Then, the output of the frequency transform part 1 is inputted to the time axis data expansion part 2.

The time axis data expansion part 2 extracts K+N pieces of data corresponding to at least one symbol which includes an effective symbol and a guard interval, and then, adds zero before and after the extracted data to generate 2N pieces of data. As one example, the time axis data expansion part 2 extracts K+N pieces of data corresponding to at least one symbol including the guard interval from the output signal of the frequency transform part 1, and generates 2N pieces of samples as the expanded data by adding (N−K)/2 pieces of zero before and after the extracted data.

The above function of the time axis data expansion part 2 will be described here using a Drawing. FIG. 2 is a view for showing a relation between input and output of the time axis data expansion part 2. Suppose, the orthogonal frequency division multiplexing signal having a guard interval GI consisted of K pieces of data and an effective symbol period consisted of N pieces of data, is successively inputted to the time axis data expansion part 2. The time axis data expansion part 2 adds a part of each of adjacent symbols and zero before and after data of one symbol consisted of K+N pieces, expanding one symbol to 2N pieces of data to output. The respective parts of the adjacent symbols may be not necessarily included.

Next, the output of the time axis data expansion part 2 is inputted to the window shaping part 3. The window shaping part 3 shapes a waveform per one symbol consisted of 2N pieces of data after the expansion to output. At this time, a window coefficient used for a waveform shaping is inputted to the window shaping part 3 from a window coefficient generation part 7. That is, the window shaping part 3 performs a waveform shaping by multiplying the output of the time axis data expansion part 2 by the window coefficient (window function) given by the window coefficient generation part 7.

Figure 3:
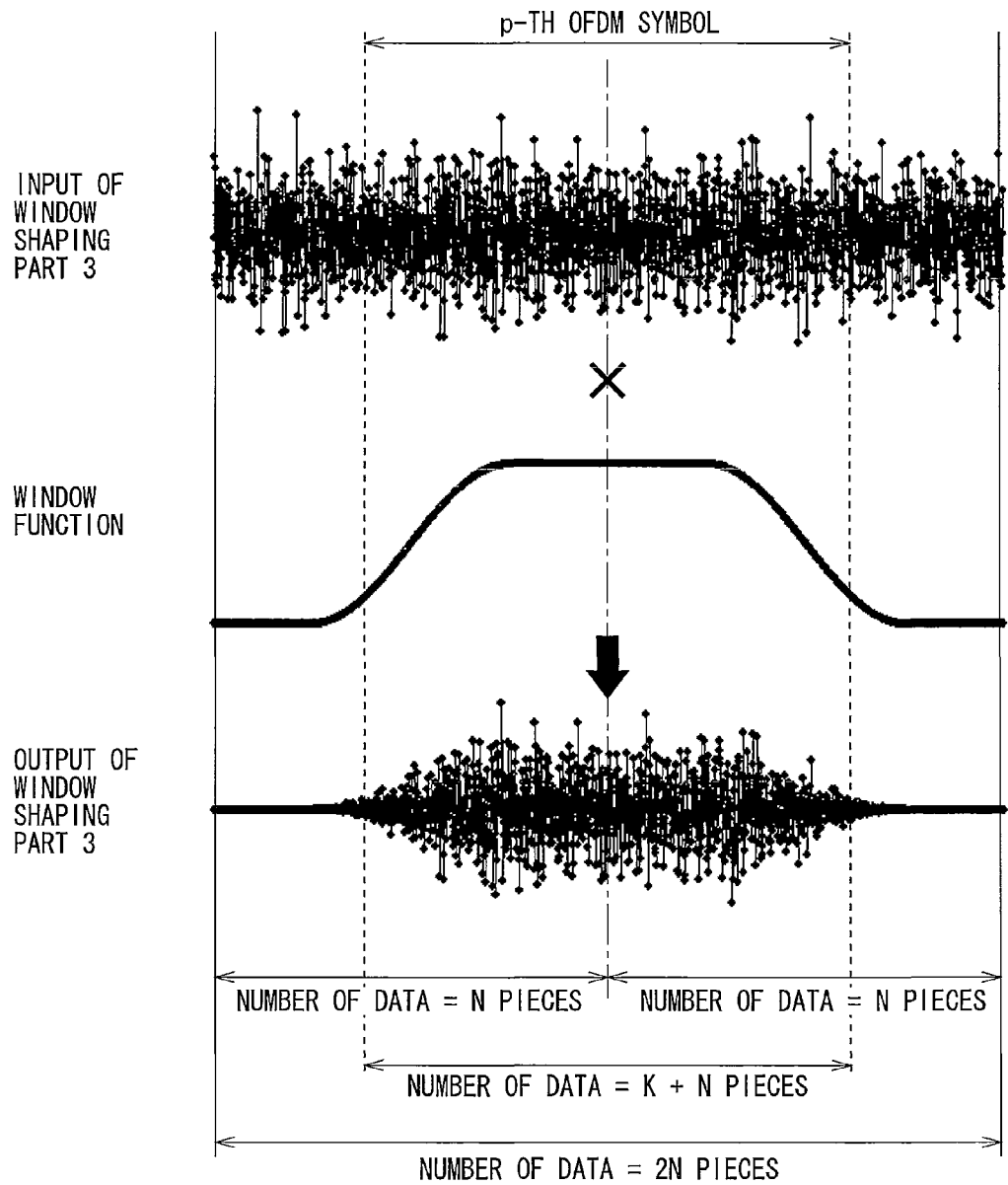
FIG. 3 is a view for showing a relation between input and output of a window shaping part.

Here, a function of the window shaping part 3 will be described using a Drawing. FIG. 3 is a view for showing a relation between input and output of the window shaping part 3. The waveform shaping by the window function is implemented by multiplying N pieces of the first half data and N pieces of the last half data of the inputted 2N pieces of data by the window coefficient in which a value gets gradually smaller from the center to the outside as shown in FIG. 3.

Next, the output of the window shaping part 3 is inputted to the discrete Fourier transform part 4. The discrete Fourier transform part 4 performs the discrete Fourier transform of 2N points to generate a received signal per sub-carrier. At this time, within 2N pieces of data outputted from the discrete Fourier transform part 4, the received signal for M pieces of transmitted sub-carriers is outputted alternately to a predetermined frequency position.

Figure 4:
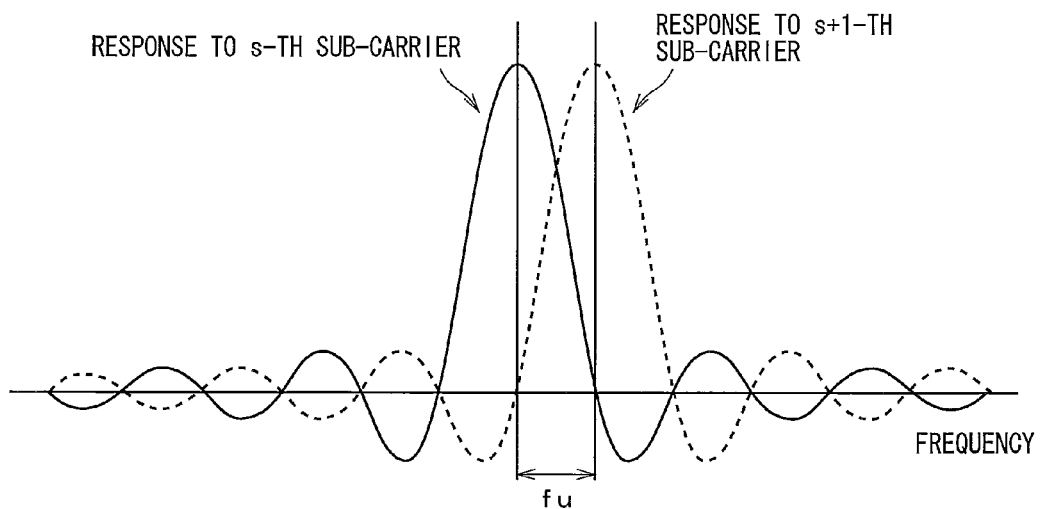
FIG. 4 is a view for showing impulse response waveforms of a square-shaped window function.

Here, the principle of reducing the inter-carrier interference by shaping a waveform of the received signal before the discrete Fourier transform with the window function will be described. As is the conventional technology, the case of performing the discrete Fourier transform directly in the discrete Fourier transform 4 to the output of the frequency transform part 1 without shaping a waveform is equivalent to the case of multiplying a signal by a square-shaped window function with the discrete Fourier transform. In this case, supposed that a channel is an ideal channel, each sub-carrier component after the discrete Fourier transform can be represented by a product of a function expressed with an equation (1) (hereinafter, also referred to as an "impulse response of the window function") and the transmitted data. In this regard, in the equation (1) of a formula 1, f represents a frequency, and $f_u$ represents a minimum sub-carrier interval. FIG. 4 shows an impulse response waveform of a square-shaped window function with respect to the sub-carrier after the discrete Fourier transform at this time. As shown in FIG. 4, frequency is orthogonal among sub-carriers so that all the amplitude of each sub-carrier is zero in frequency of other sub-carrier. This means that the inter-carrier interference is not generated as long as the orthogonal relation is kept.

[Formula 1]

$$W(f) = \frac{\sin(\pi f / f_u)}{\pi f / f_u} \quad (1)$$

Figure 5:
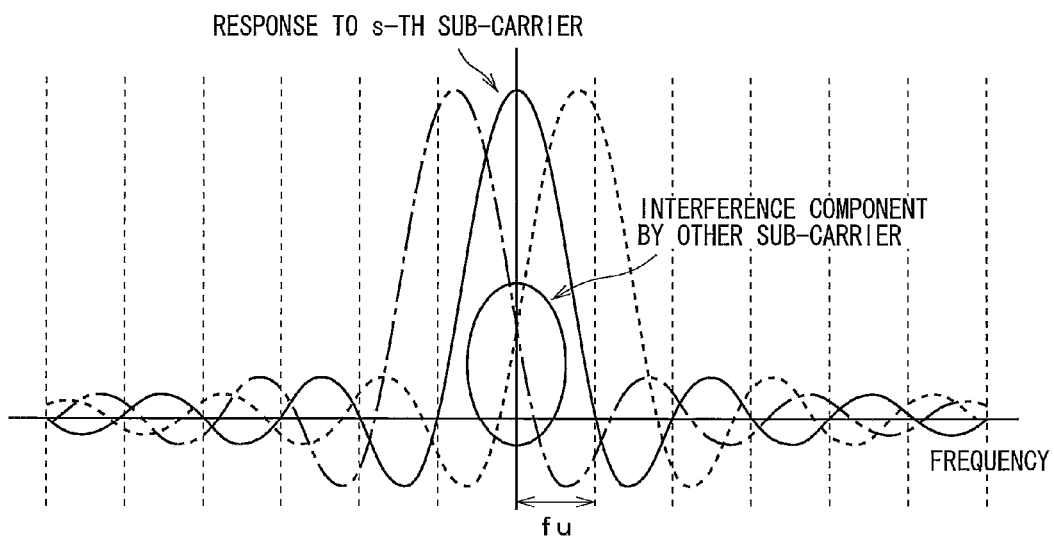
FIG. 5 is a view for showing an impulse response waveform with inter-carrier interference.

However, when orthogonality of the sub-carriers is collapsed by synchronous misalignment of the sub-carrier frequency, inter-symbol interference, and a time variation of a channel characteristic, the inter-carrier interference is generated so that signal components interfere with each other among sub-carriers as shown in FIG. 5. The size of the interference at this time depends on the impulse response of the window function, and is influenced by an amplitude value adjacent to a frequency in which the amplitude is zero. In this regard, the larger this amplitude is, the larger the inter-carrier interference component is.

Figure 6:
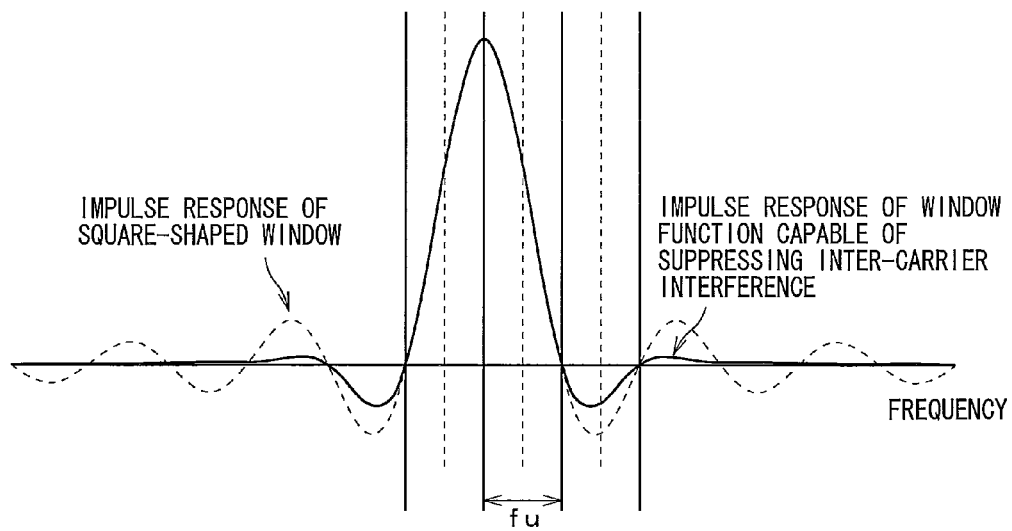
FIG. 6 is a view for showing impulse response waveforms of a window function according to the present invention and the square-shaped window function.

On the other hand, in the case that a symbol with a waveform shaped by the window coefficient is subjected to the discrete Fourier transform, the sub-carrier component in the output of the discrete Fourier transform can make the amplitude adjacent to zero point smaller than the square-shaped window function, as seen in the impulse response waveform shown by a solid line in FIG. 6. This means that the inter-carrier interference can be reduced.

An example of the window coefficient in the above is shown in an equation (2). Note that a in the equation (2) is a positive constant which is greater than or equal to 0 and less than or equal to 1.

[Formula 2]

$$W(f) = \begin{cases} 1, & 0 \le |f/f_u| < \frac{1-\alpha}{2} \\ \frac{1}{2}\left\{1 - \sin\left[\frac{\pi}{2\alpha}\left(2\frac{f}{f_u} - 1\right)\right]\right\}, & \frac{1-\alpha}{2} < |f/f_u| \le \frac{1+\alpha}{2} \\ 0, & \frac{1+\alpha}{2} < |f/f_u| \end{cases} \quad (2)$$

The output of the discrete Fourier transform part 4 is inputted to an inter-carrier interference component calculation part 6 and a demodulation part 5. The demodulation part 5 extracts the transmitted sub-carrier component from the output of the discrete Fourier transform part 4, and performs a demodulation per sub-carrier to output a demodulation signal per sub-carrier. Further, the inter-carrier interference component calculation part 6 detects the size of the inter-carrier interference component to output a multi-valued signal in accordance therewith to the window coefficient generation part 7. The window coefficient generation part 7 determines a window function used in the window shaping part 3 on the basis of the output of the inter-carrier interference component calculation part 6 to output a window coefficient corresponding thereto.

Figure 7:
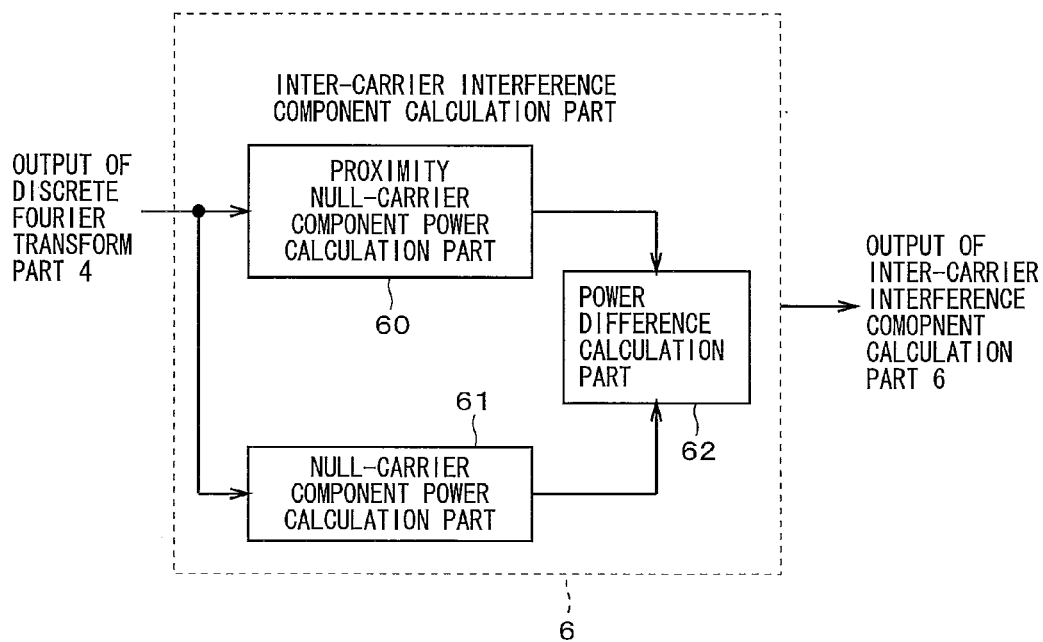
FIG. 7 is a block diagram for showing a configuration example of an inter-carrier interference component calculation part.

Here, the inter-carrier interference component calculation part 6 will be described. FIG. 7 is a block diagram for showing a configuration example of the inter-carrier interference component calculation part 6. As shown in FIG. 7, the inter-carrier interference component calculation part 6 is consisted of a proximity null-carrier component power calculation part 60, a null-carrier component power calculation part 61 and a power difference calculation part 62, and the output of the power difference calculation part 62 corresponds to the output of the inter-carrier interference component calculation part 6.

Next, an operation of the inter-carrier interference component calculation part 6 will be described. The proximity null-carrier component power calculation part 60 calculates signal power of a frequency component corresponding to a position outside a transmitted signal band and being distanced by a predetermined frequency from a sub-carrier component at the end of the transmitted signal band to output with the output of the discrete Fourier transform part 4 as input. Here, a "position being distanced by a predetermined frequency" may be regarded as a "position distanced by a minimum frequency interval of transmitted sub-carriers". On the other hand, the null-carrier component power calculation part 61 calculates signal power of a frequency component outside the transmitted signal band and being distanced much far from the sub-carrier component at the end of the transmitted signal band than the frequency component referred to by the proximity null-carrier component power calculation part 60 to output with the output of the discrete Fourier transform part 4 as input. The power difference calculation part 62 subtracts the output of the null-carrier component power calculation part 61 from the output of the proximity null-carrier component power calculation part 60 to output the subtracted value as the output of the inter-carrier interference component calculation part 6. At this time, while the sum of noise power and an inter-carrier interference component is detected from the output of the proximity null-carrier component power calculation part 60, the noise power is detected from the output of the null-carrier component power calculation part 61, so that the output of the power difference calculation part 62 represents a signal which is proportional to the size of the inter-carrier interference component. FIG. 8 shows a power component calculated by the inter-carrier interference component calculation part 6 having a configuration in the above.

Next, the output of the inter-carrier interference component calculation part 6 is inputted to the window coefficient generation part 7. The window coefficient generation part 7 selects a window function in accordance with the size of the inter-carrier interference and outputs a window coefficient on the basis of the selected window function. At this time, the window coefficient generation part 7 selects a window function having a gentler curve as the calculated inter-carrier interference gets larger.

As for the window coefficient, what is given by the window function expressed by the equation (2) of the formula 2 is previously stored in a table, for example. In this case, as a value of $\alpha$ becomes larger, the window function has a gentler curve. That is, as the value of $\alpha$ is larger, an amplitude value adjacent a frequency in which amplitude is zero with regard to the impulse response of the window function becomes smaller. Therefore, as the inter-carrier interference is larger, the window coefficient generation part 7 operates to select a larger window function for the value of $\alpha$, allowing to improve the receiving performance of the receiver. As described above, the window coefficient generation part 7 comprises a window coefficient table (not shown) with the output of the inter-carrier interference component calculation part 6 as input thereof, and the window coefficient table stores a plurality of the window coefficients on the basis of the size of the inter-carrier interference, so that a characteristic of the window function represented by each window coefficient stored in the window coefficient table can be said to have a gentler curve as the above-inter-carrier interference is larger.

Also, as one example, the window coefficient table (1) includes coefficients of a rectangular window function (square-shaped window coefficient), giving one which is a constant coefficient, to central N pieces of data in 2N pieces of data, and giving a coefficient of zero to other data (corresponding to the case that a in the equation (2) is zero), (2) and further may include a roll-off characteristic (corresponding to the case that a in the equation (2) is not zero, e.g., the case of the window function in FIG. 3) which has a coefficient of 0.5 at a boundary between the coefficient of one and the coefficient of zero in the rectangular window function, with reference to this boundary, as another window function.

Which window function is selected on the basis of the size of the inter-carrier interference by the window coefficient generation part 7 from the window coefficient table, is previously defined by simulation or experiment.

As described in the above, the receiving apparatus according to the first preferred embodiment is configured such that a signal section performing the discrete Fourier transform is expanded to twice as much as one OFDM symbol, and the discrete Fourier transform is performed after performing a waveform shaping by the window function, detecting the size of the inter-carrier interference from the output of the discrete Fourier transform to select the window function in accordance with the size thereof. Therefore, it is possible to perform the demodulation operation so as to minimize the inter-carrier interference caused by synchronous misalignment of a sub-carrier frequency between the transmitter and receiver, synchronous misalignment of a symbol timing such that the inter-symbol interference is generated, or a time variation of a channel characteristic and the like, allowing to improve the receiving performance of the receiver.

Also, when the window coefficient is constant, the window coefficient which is not zero can be multiplied to an adjacent OFDM symbol section due to the influence of the timing synchronous misalignment of the receiver or a length of the guard interval. In this case, the receiving performance is considered to be deteriorated by signal components of adjacent symbols being superimposed. In this regard, the receiving apparatus according to the present embodiment allows the above performance deterioration to be reduced by changing the window coefficient in accordance with the size of the inter-carrier interference component.

(Variation 1)

A variation 1 of the inter-carrier interference component calculation part 6 will be described below.

Figure 9:
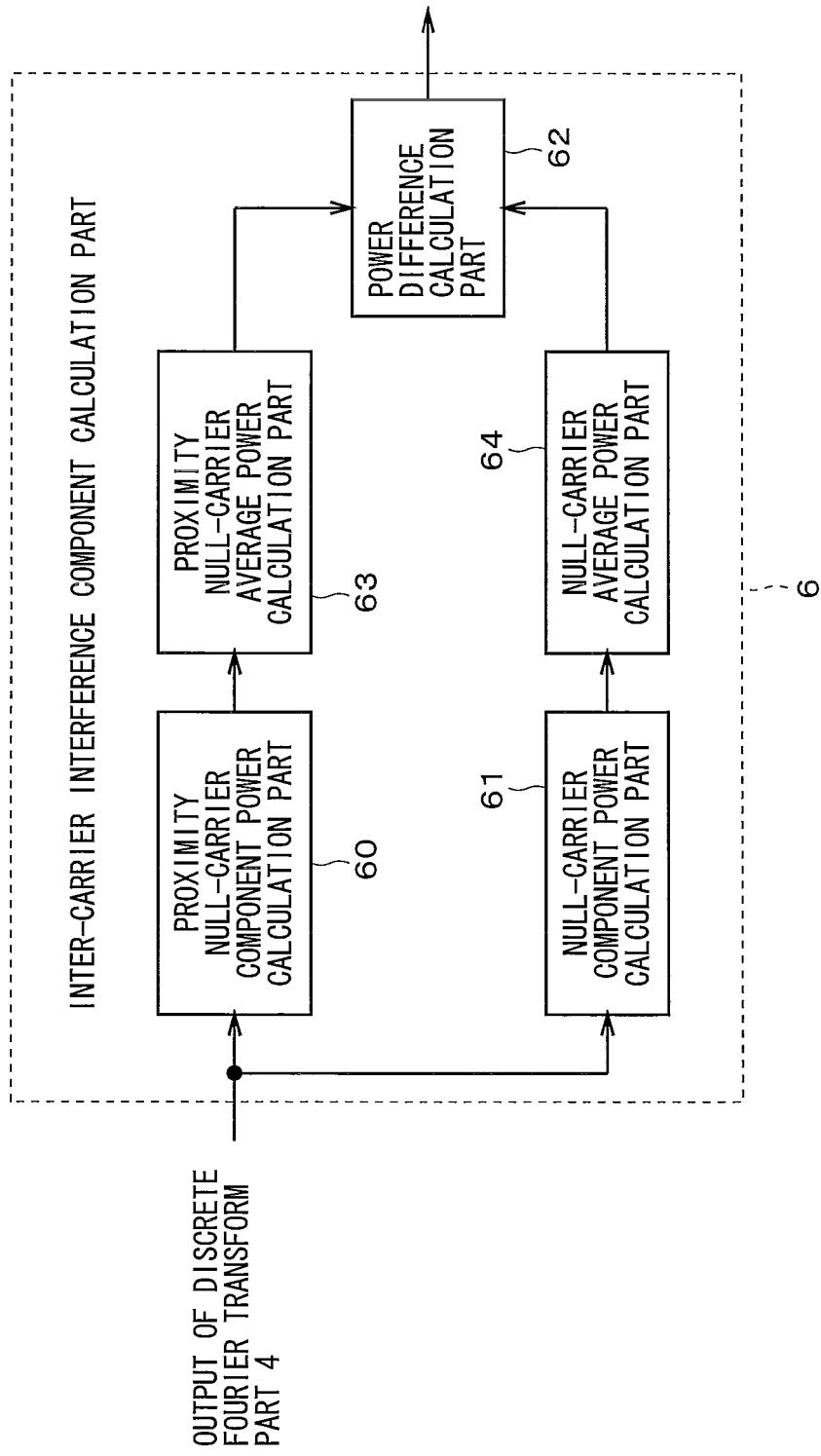
FIG. 9 is a block diagram for showing a variation example of the inter-carrier interference component calculation part.

FIG. 9 is a block diagram for showing a configuration of the inter-carrier interference component calculation part 6 in the present variation. In FIG. 9, parts 60, 61 and 62 are equivalent to corresponding elements in FIG. 7, respectively. In this variation, the inter-carrier interference component calculation part 6 further includes a proximity null-carrier average power calculation part 63 and a null-carrier average power calculation part 64.

Next, an operation of the inter-carrier interference component calculation part 6 shown in FIG. 9 will be described. Each operation of the parts 60 and 61 is same as the operation described regarding the parts 60 and 61 in FIG. 7, respectively. In this variation, the proximity null-carrier average power calculation part 63 calculates an average value of several symbols to output the average value among symbols with the output of the proximity null-carrier component power calculation part 60 as input thereof. Further, the null-carrier average power calculation part 64 calculates an average value of several symbols to output the average value among symbols with the output of the null-carrier component power calculation part 61 as input thereof. The power difference calculation part 62 in FIG. 9 receives the output of the proximity null-carrier average power calculation part 63 instead of the proximity null-carrier component power calculation part 60 as one input, and receives the output of the null-carrier average power calculation part 64 instead of the null-carrier component power calculation part 61 as the other input. That is an only difference from the configuration of FIG. 7. Accordingly, the output of the power difference calculation part 62 is a signal being proportional to the size of the inter-carrier interference to be output of the inter-carrier interference component calculation part 6.

The average value among symbols is used as is in the above variation 1 to calculate the inter-carrier interference component, allowing to improve the accuracy for detecting the inter-carrier interference component.

(Variation 2)

Furthermore, a variation 2 of the inter-carrier interference component calculation part 6 will be described.

Figure 10:
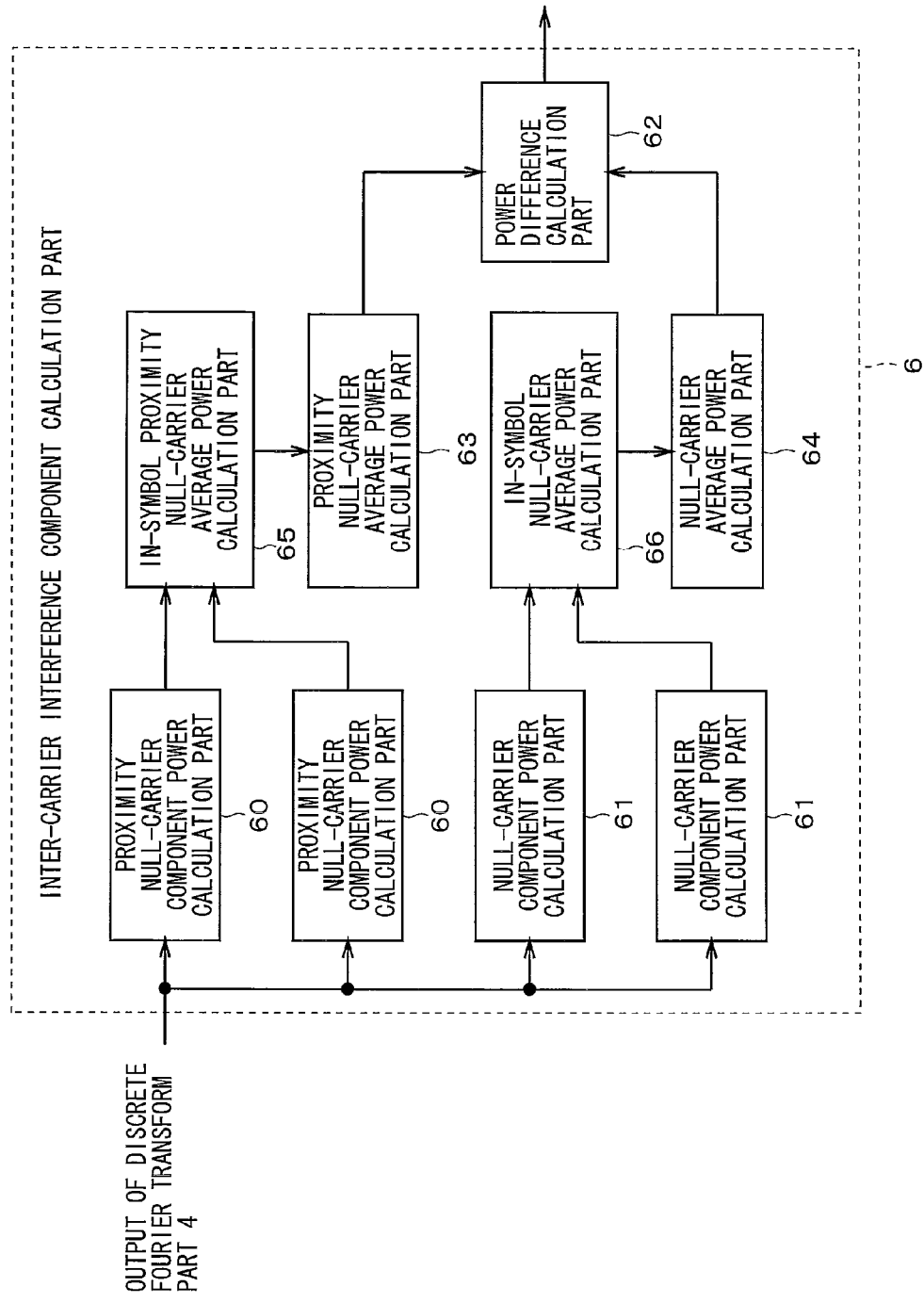
FIG. 10 is a block diagram for showing another variation example of the inter-carrier interference component calculation part.

FIG. 10 is a block diagram for showing another variation of the inter-carrier interference component calculation part 6. The configuration of FIG. 10 includes a plurality of the proximity null-carrier component power calculation parts 60 and null-carrier component power calculation parts 61. Then, an in-symbol proximity null-carrier average power calculation part 65 averages each output of the respective proximity null-carrier component power calculation parts 60 within one symbol. Similarly, an in-symbol null-carrier average power calculation part 66 averages each output of the respective null-carrier component power calculation parts 61 within one symbol. Here, the respective proximity null-carrier component power calculation parts 60 and the respective null-carrier component power calculation parts 61 calculate signal power of a different frequency component for each. For instance, signal power may be calculated at each side of high frequency and low frequency of a signal band (see FIG. 8). Further, the output of the in-symbol proximity null-carrier average power calculation part 65 and the output of the in-symbol null-carrier average power calculation part 66 is inputted to the proximity null-carrier average power calculation part 63 and the null-carrier average power calculation part 64, respectively. Then, each of the proximity null-carrier average power calculation part 63 and the null-carrier average power calculation part 64 calculates an average value of power for several symbols to output. An operation of the power difference calculation part 62 is similar to that of the configuration shown in FIG. 9.

The average value within a symbol and the average value among symbols are used as is in the present variation to calculate the inter-carrier interference component, allowing to further improve the accuracy for detecting the interference component.

(Second Preferred Embodiment)

The first preferred embodiment describes the configuration in which the size of the inter-carrier interference is estimated in the inter-carrier interference component calculation part 6, and the window coefficient generation part 7 is used for directly selecting a window function from the size thereof. In contrast, the present embodiment describes the configuration of using the window coefficient generation part 7 for selecting an optimum window function in accordance with increase and decrease of the detected result of the inter-carrier interference. Other elements are same as the corresponding elements in the first preferred embodiment, and its variations 1 and 2.

FIG. 11 is a block diagram for showing the window coefficient generation part 7 according to the present embodiment. The window coefficient generation part 7 of FIG. 11 is consisted of a memory part 70, a window function determination part 71, a window coefficient table part 72 and an effective window coefficient storing part 73.

Next, an operation of the windows coefficient generation part 7 of FIG. 11 will be described. First, the output of the inter-carrier interference component calculation part 6 is inputted to the memory part 70 and the window function determination part 71. The memory part 70 holds a current value until next new output of the inter-carrier interference component calculation part 6 is inputted. The window function determination part 71 compares the output of the memory part 70 and the output of the inter-carrier interference component calculation part 6 to determine increase and decrease of the size of the inter-carrier interference caused by the current window function, and at the same time determines the optimum window coefficient from the output of the effective window coefficient storing part 73 and the output of the window coefficient table part 72 in accordance with the increase and decrease to output. Here, the window coefficient table part 72 previously stores window coefficients corresponding to a plurality of window functions each having different impulse response. Further, the effective window coefficient storing Part 73 stores the latest window coefficient determined to have an effect of suppressing the inter-carrier interference by the window function determination part 71.

Here, a window coefficient control in the second preferred embodiment will be described. The window coefficient control in the present embodiment determines to what extent the inter-carrier interference decreases by changing the window coefficient. That is, when the decreasing amount of the inter-carrier interference is larger than the first threshold value, the window function determination part 71 determines the effect of suppressing the inter-carrier interference with the current window coefficient to be great, and stores the current window coefficient in the effective window coefficient storing part 73. At the same time, the window function determination part 71 newly selects a window function from the window coefficient table part 72, the window function having an amplitude value adjacent a frequency in which amplitude becomes zero in the impulse response, the amplitude value being smaller than the current window function, to output the selected window coefficient to the window shaping part 3. When the inter-carrier interference increases by employing a new window coefficient, and the amount thereof is greater than the second threshold value, the window function determination part 71 changes once again the window function to be employed from the above new window function to the window function stored in the effective window coefficient storing part 73. On the other hand, when the inter-carrier interference decreases by employing the new window coefficient, and the decreasing amount is greater than the first threshold value, the window function determination part 71 changes the window coefficient stored in the effective window coefficient storing part 73 to the current new window coefficient. In contrast, when the decreasing amount of the inter-carrier interference is smaller than the first threshold value or the increasing amount of the inter-carrier interference is smaller than the second threshold value, the window function determination part 71 does not change the window coefficient stored in the effective window coefficient storing part 73.

As described above, the present embodiment is constituted such that the window function determination part 71 selects the optimum window function (window coefficient) on the basis of the amount of increasing and decreasing of the inter-carrier interference, so that it is unnecessary to previously determine the optimum window coefficient with respect to the size of the inter-carrier interference, allowing to control the demodulation operation so as to minimize the inter-carrier interference caused by synchronous misalignment of a sub-carrier frequency between the transmitter and receiver, synchronous misalignment of a symbol timing such that the inter-symbol interference is generated, or a time variation of a channel characteristic and the like, to improve the receiving performance of the receiver.

(Third Preferred Embodiment)

The feature of the present embodiment is to perform a window shaping by extracting N pieces of data from the output of the frequency transform part 1 to generate 2N pieces of data using only the extracted N pieces of data. Hereinafter, the feature of the present embodiment will be described on the basis of a Drawing.

Figure 12:
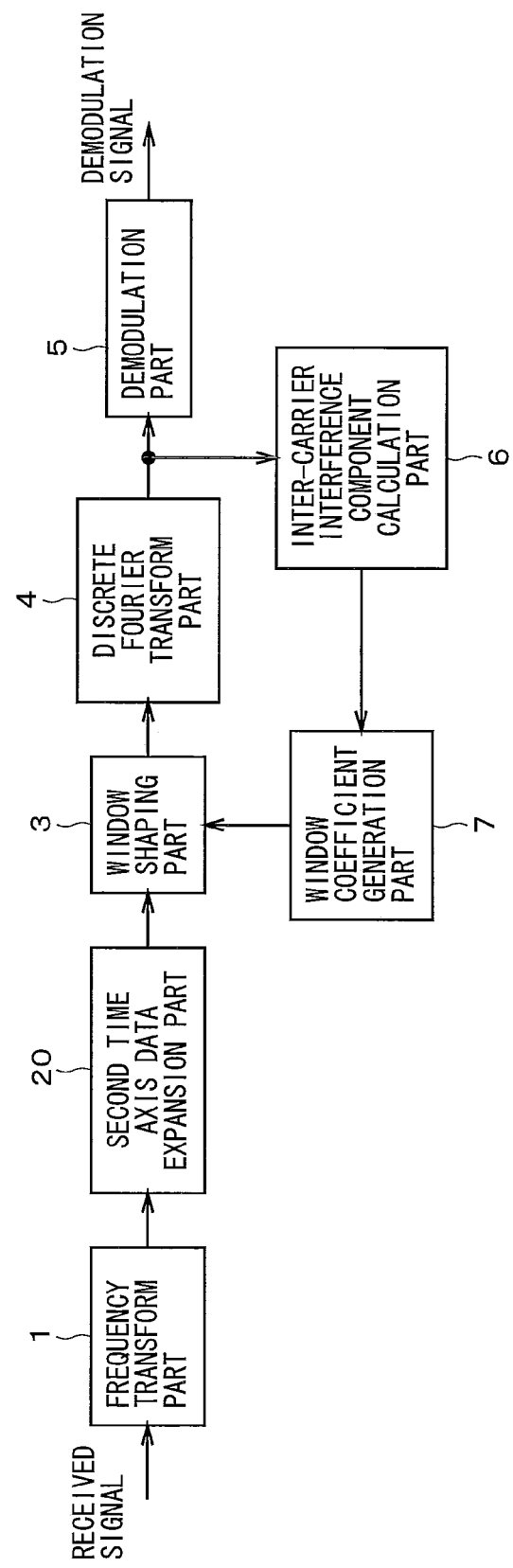
FIG. 12 is a block diagram for showing a configuration of a receiving apparatus according to the third preferred embodiment of the present invention.

FIG. 12 is a block diagram for showing a configuration of the receiving apparatus according to the present embodiment. In FIG. 12, the output of a second time axis data expansion part 20 is outputted to the window shaping part 3 with the output of the frequency transform part 1 as input. Each of other elements 1, 3 to 7 operates similarly to the elements with the same reference numbers shown in FIG. 1 of the first preferred embodiment. Accordingly, the operation of the respective elements 1, 3 to 7 will be described using the corresponding description in the first preferred embodiment.

Next, an operation of the second time axis data expansion part 20 will be described. The second time axis data expansion part 20 adds N/2 pieces of data in the first half of the inputted N pieces of data immediately after the above N pieces of data, and further adds N/2 pieces of data in the last half of the inputted N pieces of data immediately before the above N pieces of data to generate 2N pieces of data and output the above generated 2N pieces of data.

As described above, the receiving apparatus according to the present embodiment regards N pieces of data outputted from the frequency transform part 1 as a periodic signal to generate 2N pieces of data, so that it is unnecessary to consider the influence of an adjacent symbol when performing a window shaping, allowing to improve the receiving performance of the receiver.

(Additional Statement)

While the invention has been shown and described in detail, the foregoing description is in all aspects illustrative and not restrictive. It is therefore understood that numerous modifications and variations can be devised without departing from the scope of the invention.

Industrial Applicability

As a practical example of the present invention, it is preferable to apply to a ground digital broadcast receiver using an orthogonal frequency division multiplexing scheme.

The invention claimed is:

1. A receiving apparatus for receiving an orthogonal frequency division multiplexing signal generated by adding K pieces (K<N) of data which is at the end of a signal of inverse discrete Fourier transform output as a guard interval to the head of a signal after mapping transmitted data of each sub-carrier at a signal point position in accordance with a predetermined modulation scheme and performing an inverse discrete Fourier transform of N points (N>M) in order to transmit transmitted data with M pieces of sub-carriers, said receiving apparatus comprising:
a frequency transform part for transforming a frequency of said received signal to a desired frequency;
a time axis data expansion part for extracting at least K+N pieces of data corresponding to one symbol including a guard interval from output of said frequency transform part to generate 2N pieces of data by adding zero before and after the extracted data;
a window shaping part for shaping a waveform by multiplying output of said time axis data expansion part by a window coefficient;
a discrete Fourier transform part for performing a discrete Fourier transform of 2N points with respect to output of said window shaping part;
a demodulation part for performing a demodulation of sub-carriers by extracting transmitted sub-carrier components from output of said discrete Fourier transform part;
an inter-carrier interference component calculation part for calculating an inter-carrier interference component, with the output of said discrete Fourier transform part as input; and
a window coefficient generation part for selecting a window function on the basis of output of said inter-carrier interference component calculation part to output said window coefficient in accordance with the selected window function to said window shaping part, wherein
said window coefficient generation part comprises a window coefficient table with the output of said inter-carrier interference component calculation part as input thereof, said window coefficient table storing a plurality of window coefficients in accordance with a size of inter-carrier interference, and a characteristic of a window function represented by each of said window coefficients stored in said window coefficient table has a gentler curve as the size of said inter-carrier interference gets larger.

2. The receiving apparatus according to claim 1, wherein said inter-carrier interference component calculation part comprises:
a proximity null-carrier component power calculation part for calculating signal power of a frequency component corresponding to a position outside a transmitted signal band and being distanced by a predetermined frequency from a sub-carrier component at the end of the transmitted signal band, within the output of said discrete Fourier transform part;
a null-carrier component power calculation part for calculating signal power of a frequency component outside said transmitted signal band and being distanced much far from the sub-carrier component at the end of said transmitted signal band than the frequency component referred to by said proximity null-carrier component power calculation part within the output of said discrete Fourier transform part; and
a power difference calculation part for calculating a difference between output of said proximity null-carrier component power calculation part and output of said null-carrier component power calculation part, and outputting the difference value as output of said inter-carrier interference component calculation part.

3. The receiving apparatus according to claim 2, wherein the position being distanced by said predetermined frequency in said proximity null-carrier component power calculation part is a position being distanced by a minimum frequency space of transmitted sub-carriers.

4. The receiving apparatus according to claim 1, wherein said inter-carrier interference component calculation part comprises:
a proximity null-carrier component power calculation part for calculating signal power of a frequency component corresponding to a position outside a transmitted signal band and being distanced by a predetermined frequency from a sub-carrier component at the end of the transmitted signal band, within the output of said discrete Fourier transform part;
a proximity null-carrier average power calculation part for calculating an average value of several symbols by averaging output of said proximity null-carrier component power calculation part between symbols;
a null-carrier component power calculation part for calculating signal power of a frequency component outside said transmitted signal band and being distanced much far from the sub-carrier component at the end of said transmitted signal band than the frequency component referred to by said proximity null-carrier component power calculation part, within the output of said discrete Fourier transform part;
a null-carrier average power calculation part for calculating an average value of several symbols by averaging output of said null-carrier component power calculation part between symbols; and
a power difference calculation part for calculating a difference between output of said proximity null-carrier average power calculation part and output of said null-carrier average power calculation part, and outputting the difference value as output of said inter-carrier interference component calculation part.

5. The receiving apparatus according to claim 4, wherein the position being distanced by said predetermined frequency in said proximity null-carrier component power calculation part is a position being distanced by a minimum frequency space of transmitted sub-carriers.

6. The receiving apparatus according to claim 1, wherein said inter-carrier interference component calculation part comprises:
a plurality of proximity null-carrier component power calculation parts for calculating signal power of different frequency components from each other and corresponding to a position outside a transmitted signal band and being distanced by a predetermined frequency from a sub-carrier component at the end of the transmitted signal band, within the output of said discrete Fourier transform part;
an in-symbol proximity null-carrier average power calculation part for averaging signal power of a plurality of frequency components calculated in the same symbol with each output of said plurality of proximity null-carrier component power calculation parts as input thereof;
a proximity null-carrier average power calculation part for calculating an average value of several symbols by averaging output of said in-symbol proximity null-carrier average power calculation part between symbols;
a plurality of null-carrier component power calculation parts for calculating signal power of different frequency components from each other outside said transmitted signal band and being distanced much far from the sub-carrier component at the end of said transmitted signal band than the frequency component referred to by said proximity null-carrier component power calculation part, within the output of said discrete Fourier transform part;
an in-symbol null-carrier average power calculation part for averaging signal power of a plurality of frequency components calculated in the same symbol with each output of said plurality of null-carrier component power calculation parts as input thereof;
a null-carrier average power calculation part for calculating an average value of several symbols by averaging output of said in-symbol null-carrier component power calculation part between symbols; and
a power difference calculation part for calculating a difference between output of said proximity null-carrier average power calculation part and output of said null-carrier average power calculation part, and outputting the difference value as output of said inter-carrier interference component calculation part.

7. The receiving apparatus according to claim 6, wherein the position being distanced by said predetermined frequency in said proximity null-carrier component power calculation part is a position being distanced by a minimum frequency space of transmitted sub-carriers.

8. A receiving apparatus for receiving an orthogonal frequency division multiplexing signal generated by adding K pieces (K<N) of data which is at the end of a signal of inverse discrete Fourier transform output as a guard interval to the head of a signal after mapping transmitted data of each sub-carrier at a signal point position in accordance with a predetermined modulation scheme and performing an inverse discrete Fourier transform of N points (N>M) in order to transmit transmitted data with M pieces of sub-carriers, said receiving apparatus comprising:
a frequency transform part for transforming a frequency of said received signal to a desired frequency;
a time axis data expansion part for extracting at least K+N pieces of data corresponding to one symbol including a guard interval from output of said frequency transform part to generate 2N pieces of data by adding zero before and after the extracted data;
a window shaping part for shaping a waveform by multiplying output of said time axis data expansion part by a window coefficient;
a discrete Fourier transform part for performing a discrete Fourier transform of 2N points with respect to output of said window shaping part;
a demodulation part for performing a demodulation of sub-carriers by extracting transmitted sub-carrier components from output of said discrete Fourier transform part;
an inter-carrier interference component calculation part for calculating an inter-carrier interference component, with the output of said discrete Fourier transform part as input; and
a window coefficient generation part for selecting a window function on the basis of output of said inter-carrier interference component calculation part to output said window coefficient in accordance with the selected window function to said window shaping part, wherein
said window coefficient generation part comprises:
a memory part for holding a current value until a next new output of said inter-carrier interference component calculation part is inputted, with the output of said inter-carrier interference calculation part as input;
a window coefficient table for storing a plurality of window coefficients representing window functions;
an effective window coefficient storing part for storing a current window coefficient; and
a window function determination part for determining increase and decrease of the size of inter-carrier interference by comparing output of said memory part and new output of said inter-carrier interference component calculating part obtained by using a new current window coefficient to determine an optimum current window function to be newly stored in said effective window coefficient storing part from output of said effective window coefficient storing part and output selected as said new current window coefficient from said window coefficient table in accordance with the increase and decrease of the size of the inter-carrier interference.

9. The receiving apparatus according to claim 8, wherein said inter-carrier interference component calculation part comprises:
a proximity null-carrier component power calculation part for calculating signal power of a frequency component corresponding to a position outside a transmitted signal band and being distanced by a predetermined frequency from a sub-carrier component at the end of the transmitted signal band, within the output of said discrete Fourier transform part;
a null-carrier component power calculation part for calculating signal power of a frequency component outside said transmitted signal band and being distanced much far from the sub-carrier component at the end of said transmitted signal band than the frequency component referred to by said proximity null-carrier component power calculation part within the output of said discrete Fourier transform part; and
a power difference calculation part for calculating a difference between output of said proximity null-carrier component power calculation part and output of said null-carrier component power calculation part, and outputting the difference value as output of said inter-carrier interference component calculation part.

10. The receiving apparatus according to claim 9, wherein the position being distanced by said predetermined frequency in said proximity null-carrier component power calculation part is a position being distanced by a minimum frequency space of transmitted sub-carriers.

11. The receiving apparatus according to claim 8, wherein said inter-carrier interference component calculation part comprises:
a proximity null-carrier component power calculation part for calculating signal power of a frequency component corresponding to a position outside a transmitted signal band and being distanced by a predetermined frequency from a sub-carrier component at the end of the transmitted signal band, within the output of said discrete Fourier transform part;
a proximity null-carrier average power calculation part for calculating an average value of several symbols by averaging output of said proximity null-carrier component power calculation part between symbols;
a null-carrier component power calculation part for calculating signal power of a frequency component outside said transmitted signal band and being distanced much far from the sub-carrier component at the end of said transmitted signal band than the frequency component referred to by said proximity null-carrier component power calculation part, within the output of said discrete Fourier transform part;
a null-carrier average power calculation part for calculating an average value of several symbols by averaging output of said null-carrier component power calculation part between symbols; and
a power difference calculation part for calculating a difference between output of said proximity null-carrier average power calculation part and output of said null-carrier average power calculation part, and outputting the difference value as output of said inter-carrier interference component calculation part.

12. The receiving apparatus according to claim 11, wherein the position being distanced by said predetermined frequency in said proximity null-carrier component power calculation part is a position being distanced by a minimum frequency space of transmitted sub-carriers.

13. The receiving apparatus according to claim 8, wherein said inter-carrier interference component calculation part comprises:
a plurality of proximity null-carrier component power calculation parts for calculating signal power of different frequency components from each other and corresponding to a position outside a transmitted signal band and being distanced by a predetermined frequency from a sub-carrier component at the end of the transmitted signal band, within the output of said discrete Fourier transform part;
an in-symbol proximity null-carrier average power calculation part for averaging signal power of a plurality of frequency components calculated in the same symbol with each output of said plurality of proximity null-carrier component power calculation parts as input thereof;
a proximity null-carrier average power calculation part for calculating an average value of several symbols by averaging output of said in-symbol proximity null-carrier average power calculation part between symbols;
a plurality of null-carrier component power calculation parts for calculating signal power of different frequency components from each other outside said transmitted signal band and being distanced much far from the sub-carrier component at the end of said transmitted signal band than the frequency component referred to by said proximity null-carrier component power calculation part, within the output of said discrete Fourier transform part;
an in-symbol null-carrier average power calculation part for averaging signal power of a plurality of frequency components calculated in the same symbol with each output of said plurality of null-carrier component power calculation parts as input thereof;
a null-carrier average power calculation part for calculating an average value of several symbols by averaging output of said in-symbol null-carrier component power calculation part between symbols; and
a power difference calculation part for calculating a difference between output of said proximity null-carrier average power calculation part and output of said null-carrier average power calculation part, and outputting the difference value as output of said inter-carrier interference component calculation part.

14. The receiving apparatus according to claim 13, wherein the position being distanced by said predetermined frequency in said proximity null-carrier component power calculation part is a position being distanced by a minimum frequency space of transmitted sub-carriers.

15. A receiving apparatus for receiving an orthogonal frequency division multiplexing signal generated by adding K pieces (K<N) of data which is at the end of a signal of inverse discrete Fourier transform output as a guard interval to the head of a signal after mapping transmitted data of each sub-carrier at a signal point position in accordance with a predetermined modulation scheme and performing an inverse discrete Fourier transform of N points (N>M) in order to transmit transmitted data with M pieces of sub-carriers, said receiving apparatus comprising:
a frequency transform part for transforming a frequency of said received signal to a desired frequency;
a time axis data expansion part for extracting N pieces of data from output of said frequency transform part to generate 2N pieces of data by using only extracted N pieces of data;
a window shaping part for shaping a waveform by multiplying output of said time axis data expansion part by a window coefficient;
a discrete Fourier transform part' for performing a discrete Fourier transform of 2N points with respect to output of said window shaping part;
a demodulation part for performing a demodulation of sub-carriers by extracting transmitted sub-carrier components from output of said discrete Fourier transform part;
an inter-carrier interference component calculation part for calculating an inter-carrier interference component, with output of said discrete Fourier transform part as input; and
a window coefficient generation part for selecting a window function on the basis of output of said inter-carrier interference component calculation part to output said window coefficient in accordance with the selected window function to said window shaping part.

16. The receiving apparatus according to claim 15, wherein while adding N/2 pieces of data in the first half of said extracted N pieces of data immediately after said extracted N pieces of data, said time axis data expansion part generates said 2N pieces of data by adding N/2 pieces of data in the last half of said extracted N pieces of data immediately before said extracted N pieces of data.

17. The receiving apparatus according to claim 15, wherein said inter-carrier interference component calculation part comprises:
a proximity null-carrier component power calculation part for calculating signal power of a frequency component corresponding to a position outside a transmitted signal band and being distanced by a predetermined frequency from a sub-carrier component at the end of the transmitted signal band, within the output of said discrete Fourier transform part;
a null-carrier component power calculation part for calculating signal power of a frequency component outside said transmitted signal band and being distanced much far from the sub-carrier component at the end of said transmitted signal band than the frequency component referred to by said proximity null-carrier component power calculation part within the output of said discrete Fourier transform part; and
a power difference calculation part for calculating a difference between output of said proximity null-carrier component power calculation part and output of said null-carrier component power calculation part, and outputting the difference value as output of said inter-carrier interference component calculation part.

18. The receiving apparatus according to claim 17, wherein the position being distanced by said predetermined frequency in said proximity null-carrier component power calculation part is a position being distanced by a minimum frequency space of transmitted sub-carriers.

19. The receiving apparatus according to claim 15, wherein said inter-carrier interference component calculation part comprises:
a proximity null-carrier component power calculation part for calculating signal power of a frequency component corresponding to a position outside a transmitted signal band and being distanced by a predetermined frequency from a sub-carrier component at the end of the transmitted signal band, within the output of said discrete Fourier transform part;
a proximity null-carrier average power calculation part for calculating an average value of several symbols by averaging output of said proximity null-carrier component power calculation part between symbols;
a null-carrier component power calculation part for calculating signal power of a frequency component outside said transmitted signal band and being distanced much far from the sub-carrier component at the end of said transmitted signal band than the frequency component referred to by said proximity null-carrier component power calculation part, within the output of said discrete Fourier transform part;
a null-carrier average power calculation part for calculating an average value of several symbols by averaging output of said null-carrier component power calculation part between symbols; and
a power difference calculation part for calculating a difference between output of said proximity null-carrier average power calculation part and output of said null-carrier average power calculation part, and outputting the difference value as output of said inter-carrier interference component calculation part.

20. The receiving apparatus according to claim 19, wherein the position being distanced by said predetermined frequency in said proximity null-carrier component power calculation part is a position being distanced by a minimum frequency space of transmitted sub-carriers.

21. The receiving apparatus according to claim 15, wherein said inter-carrier interference component calculation part comprises:
a plurality of proximity null-carrier component power calculation parts for calculating signal power of different frequency components from each other and corresponding to a position outside a transmitted signal band and being distanced by a predetermined frequency from a sub-carrier component at the end of the transmitted signal band, within the output of said discrete Fourier transform part;
an in-symbol proximity null-carrier average power calculation part for averaging signal power of a plurality of frequency components calculated in the same symbol with each output of said plurality of proximity null-carrier component power calculation parts as input thereof;
a proximity null-carrier average power calculation part for calculating an average value of several symbols by averaging output of said in-symbol proximity null-carrier average power calculation part between symbols;
a plurality of null-carrier component power calculation parts for calculating signal power of different frequency components from each other outside said transmitted signal band and being distanced much far from the sub-carrier component at the end of said transmitted signal band than the frequency component referred to by said proximity null-carrier component power calculation part, within the output of said discrete Fourier transform part;
an in-symbol null-carrier average power calculation part for averaging signal power of a plurality of frequency components calculated in the same symbol with each output of said plurality of null-carrier component power calculation parts as input thereof;
a null-carrier average power calculation part for calculating an average value of several symbols by averaging output of said in-symbol null-carrier component power calculation part between symbols; and
a power difference calculation part for calculating a difference between output of said proximity null-carrier average power calculation part and output of said null-carrier average power calculation part, and outputting the difference value as output of said inter-carrier interference component calculation part.

22. The receiving apparatus according to claim 21, wherein the position being distanced by said predetermined frequency in said proximity null-carrier component power calculation part is a position being distanced by a minimum frequency space of transmitted sub-carriers.

23. A receiving method for receiving an orthogonal frequency division multiplexing signal generated by adding K pieces (K<N) of data which is at the end of a signal of inverse discrete Fourier transform output as a guard interval to the head of a signal after mapping transmitted data of each sub-carrier at a signal point position in accordance with a predetermined modulation scheme and performing an inverse discrete Fourier transform of N points (N>M) in order to transmit transmitted data with M pieces of sub-carriers, said receiving method comprising:
a frequency transform step of transforming a frequency of said received signal to a desired frequency;
a time axis data expansion step of extracting at least K+N pieces of data corresponding to one symbol including a guard interval from output of said frequency transform part to generate 2N pieces of data by adding zero before and after the extracted data;

a window shaping step of shaping a waveform by multiplying output of said time axis data expansion part by a window coefficient;

a discrete Fourier transform step of performing a discrete Fourier transform of 2N points with respect to output of said window shaping step;

a demodulation step of performing a demodulation of sub-carriers by extracting transmitted sub-carrier components from output of said discrete Fourier transform step;

an inter-carrier interference component calculation step of calculating an inter-carrier interference component, with output of said discrete Fourier transform step as input; and a window coefficient generation step of selecting a window function on the basis of output of said inter-carrier interference component calculation step to output a window coefficient in accordance with the selected window function as said window coefficient used in said window shaping step, wherein said window coefficient generation step selects said window function by using a window coefficient table with the output of said inter-carrier interference component calculation step as input thereof, said window coefficient table storing a plurality of window coefficients in accordance with a size of inter-carrier interference, and a characteristic of a window function represented by each of said window coefficients stored in said window coefficient table has a gentler curve as the size of said inter-carrier interference gets larger.

24. A receiving method for receiving an orthogonal frequency division multiplexing signal generated by adding K pieces (K<N) of data which is at the end of a signal of inverse discrete Fourier transform output as a guard interval to the head of a signal after mapping transmitted data of each sub-carrier at a signal point position in accordance with a predetermined modulation scheme and performing an inverse discrete Fourier transform of N points (N>M) in order to transmit transmitted data with M pieces of sub-carriers, said receiving method comprising:

a frequency transform step of transforming a frequency of said received signal to a desired frequency;

a time axis data expansion step of extracting at least K+N pieces of data corresponding to one symbol including a guard interval from output of said frequency transform part to generate 2N pieces of data by adding zero before and after the extracted data;

a window shaping step of shaping a waveform by multiplying output of said time axis data expansion part by a window coefficient;

a discrete Fourier transform step of performing a discrete Fourier transform of 2N points with respect to output of said window shaping step;

a demodulation step of performing a demodulation of sub-carriers by extracting transmitted sub-carrier components from output of said discrete Fourier transform step;

an inter-carrier interference component calculation step of calculating an inter-carrier interference component, with output of said discrete Fourier transform step as input; and a window coefficient generation step of selecting a window function on the basis of output of said inter-carrier interference component calculation step to output a window coefficient in accordance with the selected window function as said window coefficient used in said window shaping step, wherein said window coefficient generation step selects said window function by using a window coefficient generation part, said window coefficient generation part comprising:

a memory part for holding a current value until a next new output of said inter-carrier interference component calculation part is inputted, with the output of said inter-carrier interference calculation part as input;

a window coefficient table for storing a plurality of window coefficients representing window functions;

an effective window coefficient storing part for storing a current window coefficient; and a window function determination part for determining increase and decrease of the size of inter-carrier interference by comparing output of said memory part and new output of said inter-carrier interference component calculating part obtained by using a new current window coefficient to determine an optimum current window function to be newly stored in said effective window coefficient storing part from output of said effective window coefficient storing part and output selected as said new current window coefficient from said window coefficient table in accordance with the increase and decrease of the size of the inter-carrier interference.

25. A receiving method for receiving an orthogonal frequency division multiplexing signal generated by adding K pieces (K<N) of data which is at the end of a signal of inverse discrete Fourier transform output as a guard interval to the head of a signal after mapping transmitted data of each sub-carrier at a signal point position in accordance with a predetermined modulation scheme and performing an inverse discrete Fourier transform of N points (N>M) in order to transmit transmitted data with M pieces of sub-carriers, said receiving apparatus comprising:

a frequency transform step for transforming a frequency of said received signal to a desired frequency;

a time axis data expansion step for extracting N pieces of data from output of said frequency transform part to generate 2N pieces of data by using only extracted N pieces of data;

a window shaping step for shaping a waveform by multiplying output of said time axis data expansion part by a window coefficient;

a discrete Fourier transform step for performing a discrete Fourier transform of 2N points with respect to output of said window shaping step;

a demodulation step for performing a demodulation of sub-carriers by extracting transmitted sub-carrier components from output of said discrete Fourier transform step;

an inter-carrier interference component calculation step for calculating an inter-carrier interference component, with output of said discrete Fourier transform step as input; and a window coefficient generation step for selecting a window function on the basis of output of said inter-carrier interference component calculation step to output said window coefficient in accordance with the selected window function as said window coefficient used in said window shaping step.

* * * * *